G. W. & J. A. Alger,
Dressing Stone.
N° 623.   Patented Mar. 3, 1838.
Fig: 1.
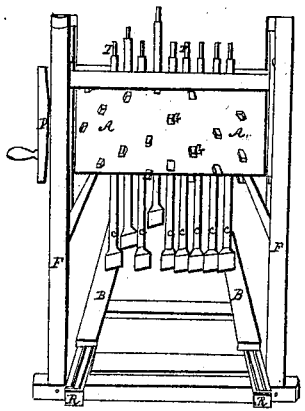
Fig: 2.
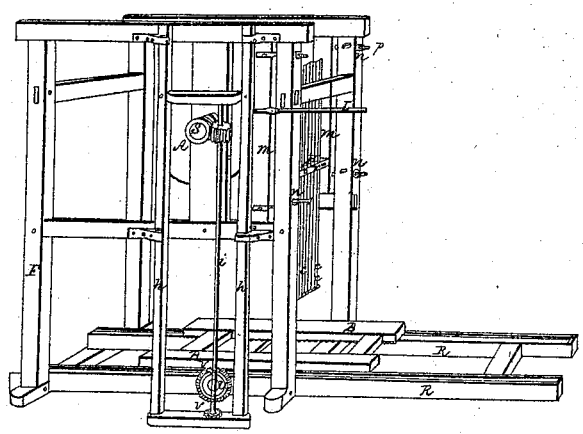
Fig: 3.
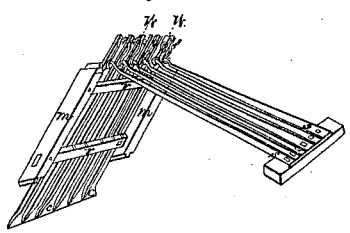
Fig: 4.
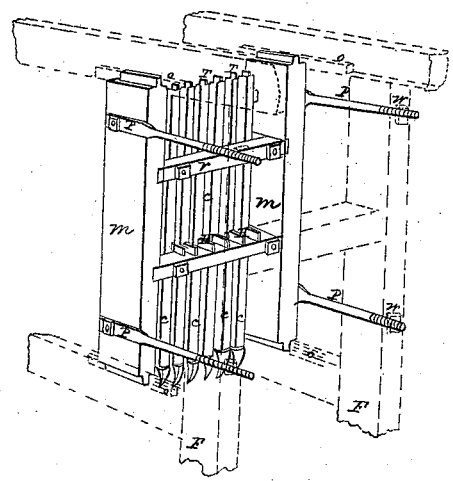
Witnesses:
John Reynolds Jr.
Silas N. Beede.
Inventors:
Geo. W. Alger.
John A. Alger

UNITED STATES PATENT OFFICE.

GEO. W. ALGER AND JOHN A. ALGER, OF SOUTH STRAFFORD, VERMONT.

MACHINE FOR CUTTING AND DRESSING STONE.

Specification of Letters Patent No. 623, dated March 3, 1838; Antedated September 3, 1837.

*To all whom it may concern:*

Be it known that we, GEO. W. ALGER and JOHN A. ALGER, of South Strafford, in the county of Orange and State of Vermont, have invented a new and useful Machine for Hewing Stone; and we do hereby declare that the following is a full and exact description.

Our invention consists of a frame of timber on which are iron rails and thus forming a rail road; a carriage in which are fixed truck wheels running upon the rails; a strong frame of sufficient width for the carriage to pass through; a cylinder with cogs or cams for raising the chisels. On one end of the cylinder shaft is the main pulley. On the opposite end is a screw, which acts upon, and turns a perpendicular shaft, on the lower end of which are two small cog wheels which act upon a larger cog wheel fixed on a horizontal shaft which moves the carriage. At a suitable distance from the cylinder are two rests through which a set of chisels pass and which govern the same; these rests are framed into two movable posts which are governed by nuts and screws passing through the main post.

To enable others skilled in the art to make and use our invention we will proceed to describe its construction and operation.

We frame together two sticks of timber of any length desired, and somewhat wider than the stone intended to be hewn. On this we place iron rails, thus forming a rail-road R, Figures 1 and 2, for the carriage to run upon; we then construct a carriage B B of the same width of the rail road on which the stone is placed for hewing, on the under side of the carriage we fix as many truck wheels $t$ $t$ as may be necessary for sustaining the weight of the stone; these run upon the rails. A row of cogs is fixed on the under side of the carriage for the purpose of moving the same, which is done by a small cog-wheel on the horizontal shaft which is hung upon the frame first mentioned and under the rails. We then construct a strong frame F of sufficient width for the carriage to pass through the length according to the size of the machine and sufficient to contain the several parts of the machine as hereinafter described. Near the center of the frame we suspend a cylinder A A, in which are fixed cogs or cams G for raising the chisels $c$. On one end of the cylinder shaft is the pulley P, Fig. 1, where the power is applied to the machine. On the opposite end is a screw S, Fig. 2, which turns the perpendicular shaft $i$. On the lower end of this shaft are two small cog wheels $v$ $v$ one above and the other below a large cog wheel $u$ which is fixed on the end of the horizontal shaft under and carrying the carriage. The perpendicular shaft $i$ is suspended in a slide frame $h$, $h$, which is movable up and down by means of a lever L so that when the slide frame is raised by means of the lever the lower cog wheel $v$ on the lower end of the perpendicular shaft $i$ acts upon the lower side of the large cog wheel $u$, and when the slide frame $h$ $h$ is lowered by means of the lever the upper cog wheel $v$, on the lower end of the perpendicular shaft $i$ acts upon the upper side of the large cog wheel $u$, which carries the carriage in the opposite direction; therefore when the carriage has run through we raise or lower the slide frame $h$ $h$ by means of the lever L as the case requires and the carriage immediately goes in the opposite direction; or the slide frame may be moved so that neither of the cogs $v$ $v$ will act upon the cog wheel $u$ and the carriage moved either way by hand. At a suitable distance from the cylinder are two rests $r$, Figs. 2 and 4, through which a set of chisels $c$ pass and which govern the same and below which the cogs H on the chisel shafts cannot go. These rests $r$ are framed into two movable posts $m$, $m$, which are also secured in long mortises represented by dotted lines $o$ $o$ on each side of the machine by iron rods $p$, $p$, one end of which are made fast to the movable posts, and the other end a screw is cut on the rod running through the main posts and firmly secured by means of nuts $n$ on each side of these posts.

The object of the iron rods or screws $p$, $p$, and nuts is to regulate the inclination of the frame in which the chisels work, and secure it firm in its place, and also to move it by means of the nuts to or from the cylinder, thereby increasing or diminishing the height to which the chisels are raised by means of the cogs on the cylinder, thereby giving greater or less force to the blow.

The rests $r$, consist of two strong pieces of wood or other materials bolted together with iron bolts and framed into the movable posts; the chisel shafts pass between these pieces which compose the rest in notches made in one or both of them, these rests serve to regulate and govern the chisel shafts. The chisel shafts are iron with iron cogs by which they are raised; every chisel from the cog to the edge should be of a length that the stone may be left even when finished. The top of the chisel shafts may have tenons T, for the application of weights to increase the power of the stroke, or steel springs, Fig. 3, may be applied to force down the chisels by making one end fast to a girt in the frame, and the other end secured to hooks in the top of the chisel shafts by means of links or wires $w$, $w$. The springs $s$, $s$, should be so arranged that the circle which they describe in rising shall be parallel with the chisel shafts, that is, the end of the spring to which the wires are attached should be as near the chisel shaft when it is down as when it is raised. The inclination of the chisels is not intended to vary so much on any one machine, as to disarrange or destroy the effect of the springs $s$, $s$. A hole is made through the shafts which is, when the shafts are raised, above the upper rest, by which means one or more of the chisels may be stopped by raising it and thrusting a wire through the shaft.

We suggest three or more machines on the same rail road; the first with narrow chisels and inclined forced down with steel springs $s$, $s$, Fig. 3, the second with wider chisels also inclined and forced down with springs or weights and so arranged as to cut the ridges left between the chisels of the preceding set; the third or finishing set of chisels very wide and perpendicular and must stand upon an angle with the shaft sufficient to pass each other and break joints or cover the face of the stone, forced down by springs or weights or their own weight.

Moldings and carvings may be cut by shaping the chisels to the design of the work. Small stones may be raised to the chisels by means of screws or otherwise. The slide frame when raised is held up by means of a spring or otherwise.

What we claim as our invention and desire to secure by Letters Patent is—

The method of regulating the inclination of the cutters and frame in which they work together with the combination of the springs $s$, $s$, and chisels or cutter stocks constructed and operating substantially as herein described.

GEO. W. ALGER.
JOHN A. ALGER.

Witnesses:
SILAS M. BEEDE,
JOHN BURNHAM.